Figure 28:
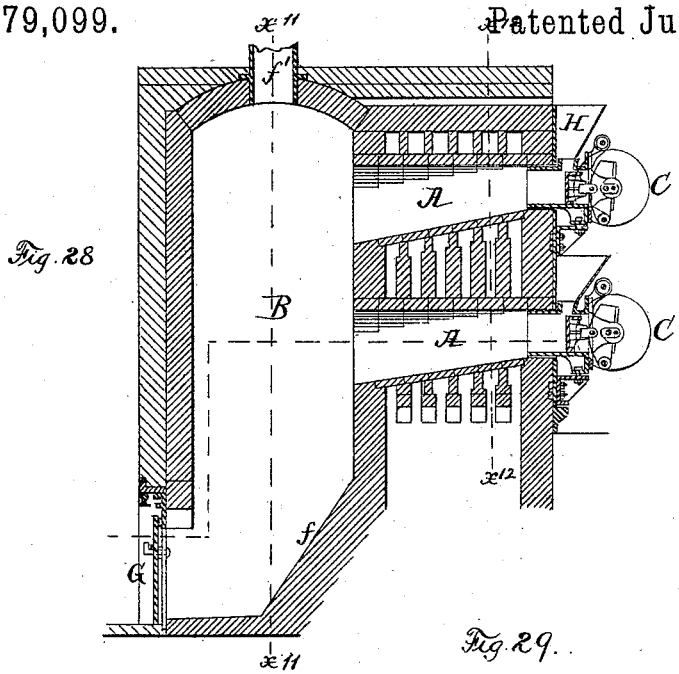

(No Model.) 6 Sheets—Sheet 1.
F. LÜRMANN.
APPARATUS FOR THE CONTINUOUS DISTILLATION, SUBLIMATION, OR ROASTING OF SOLID MATERIALS.
No. 279,099. Patented June 5, 1883.
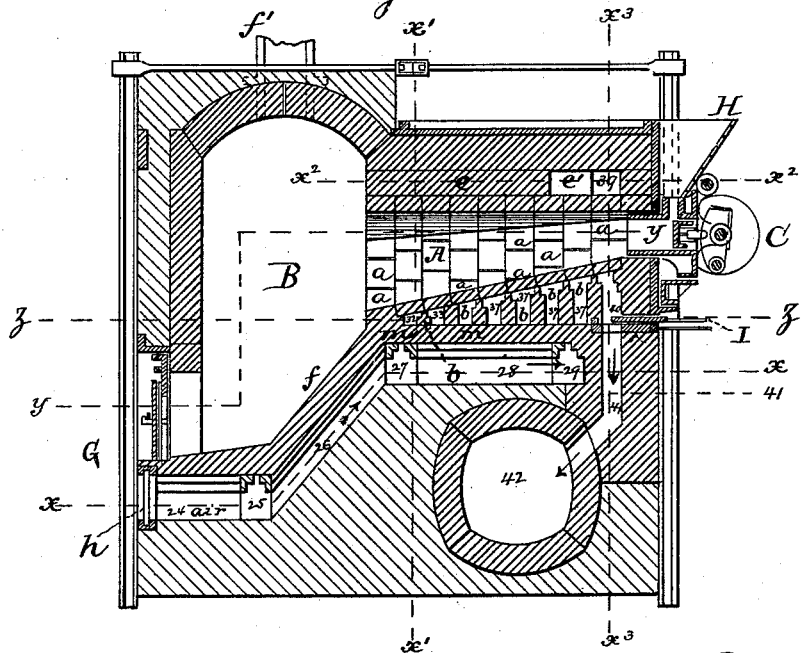
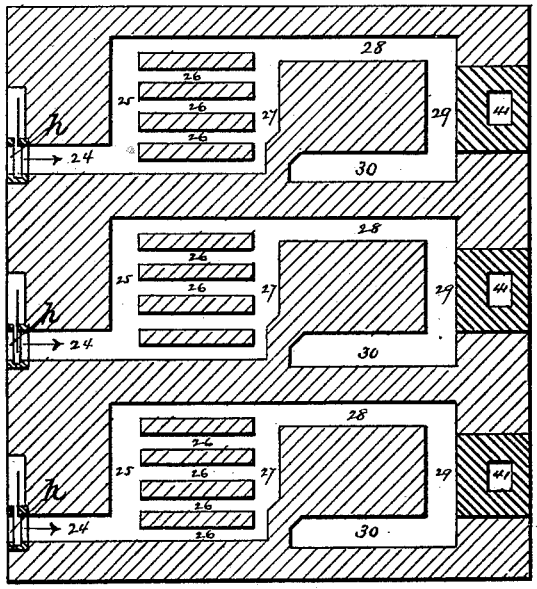
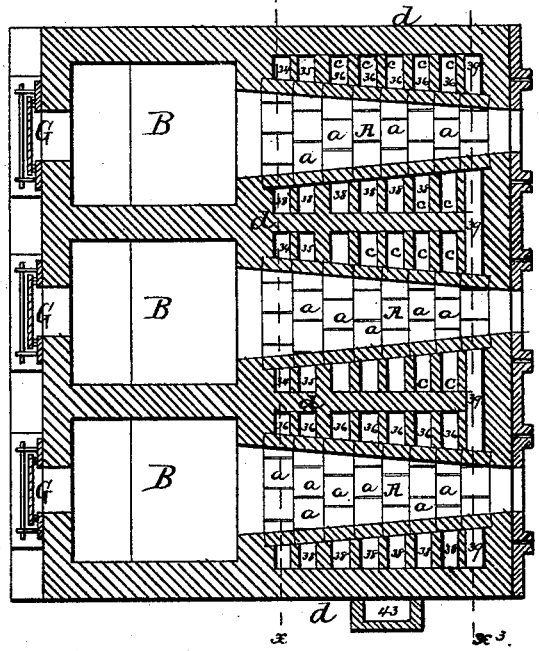
Witnesses:
Edmund Brohag
Howell Bartlett
Inventor:
Fritz Lürmann
by his Atty
Johnson and Johnson (No Model.) 6 Sheets—Sheet 2.
F. LÜRMANN.
APPARATUS FOR THE CONTINUOUS DISTILLATION, SUBLIMATION, OR ROASTING OF SOLID MATERIALS.
No. 279,099. Patented June 5, 1883.
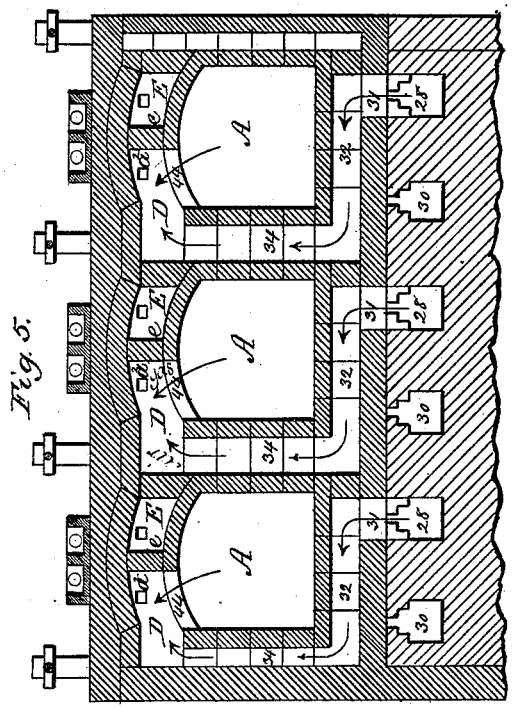
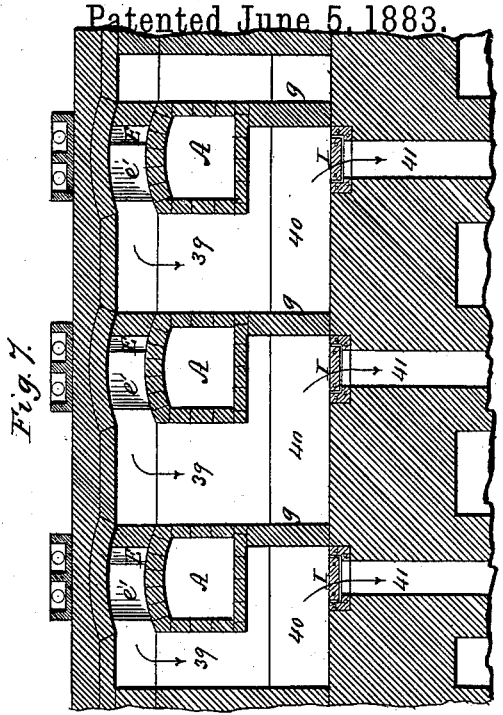
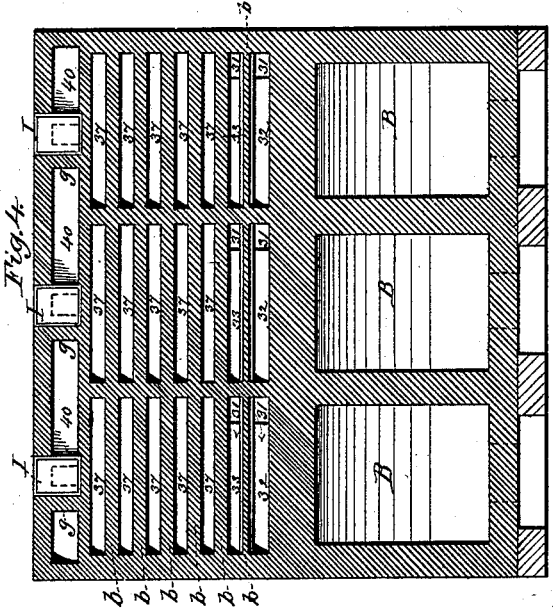
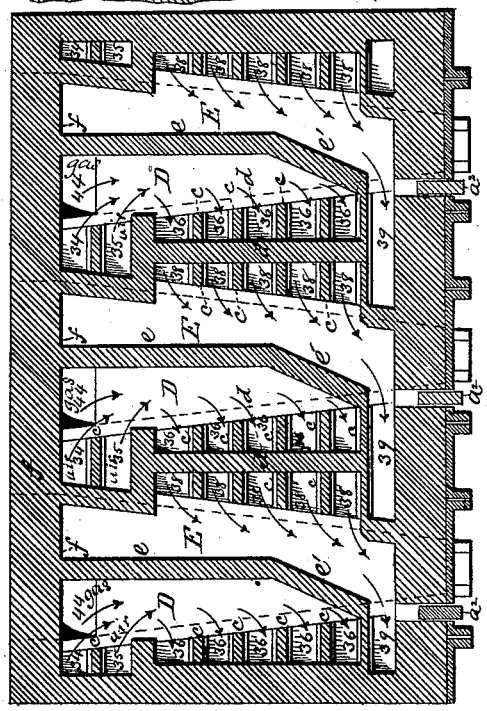
Witnesses: Edmund Brodhag, Nowell Bartle
Inventor: Fritz Lürmann by his Att'ys Johnson and Johnson (No Model.) 6 Sheets—Sheet 3.
F. LÜRMANN.
APPARATUS FOR THE CONTINUOUS DISTILLATION, SUBLIMATION, OR ROASTING OF SOLID MATERIALS.
No. 279,099. Patented June 5, 1883.
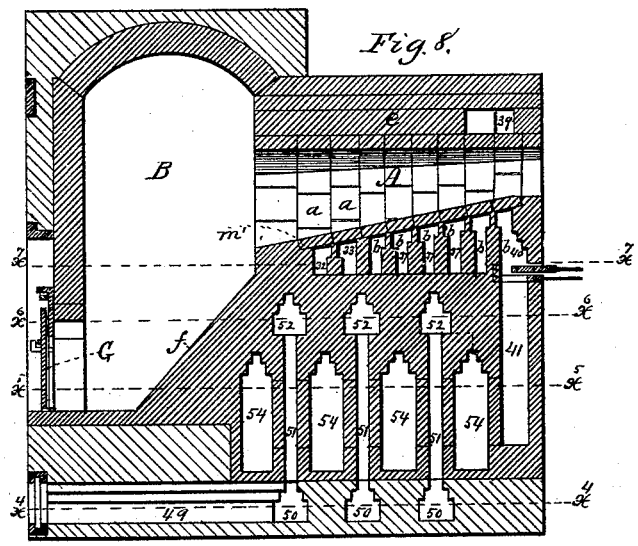
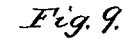
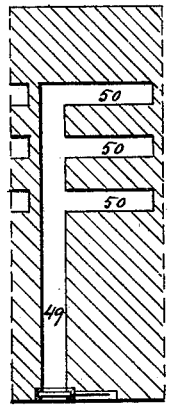
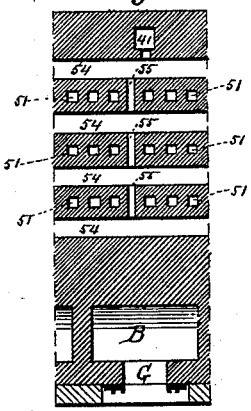
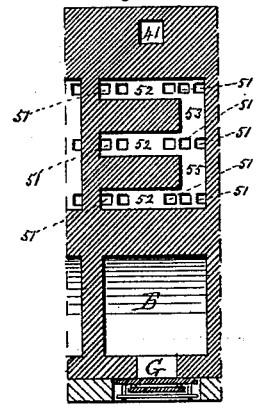
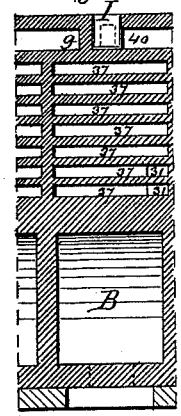
Witnesses:
Edmond Brodhag
Howell Bartte
Inventor:
Fritz Lürmann
by his Attys
Johnson and Johnson (No Model.) 6 Sheets—Sheet 4.
F. LÜRMANN.
APPARATUS FOR THE CONTINUOUS DISTILLATION, SUBLIMATION, OR ROASTING OF SOLID MATERIALS.
No. 279,099. Patented June 5, 1883.
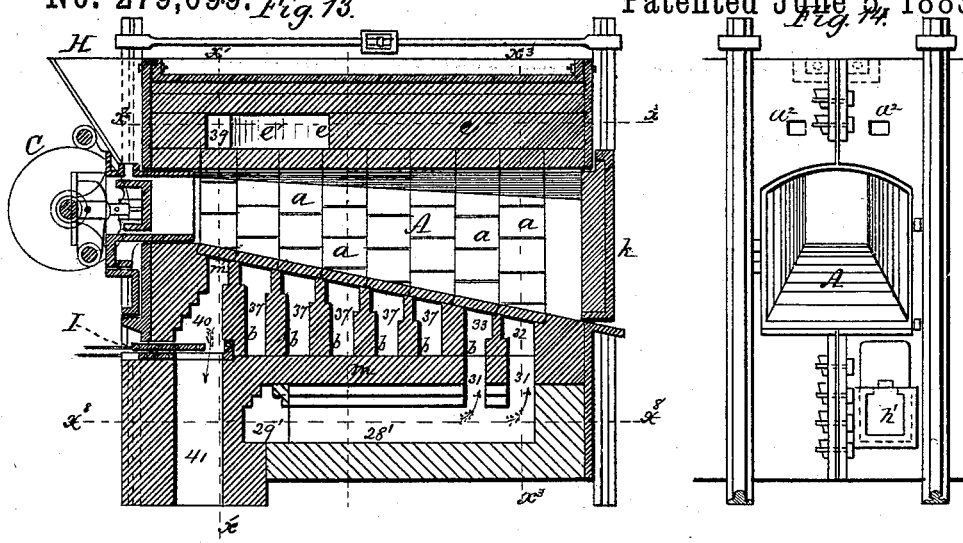
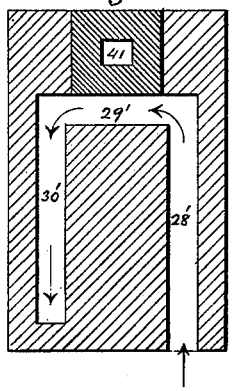
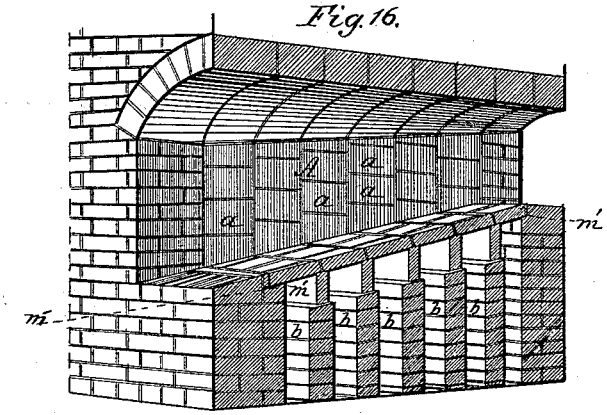
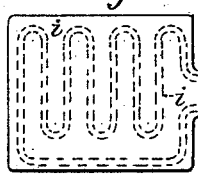
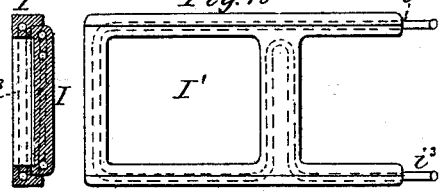
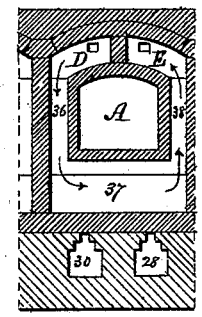
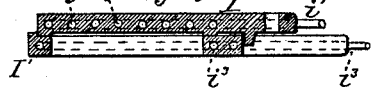
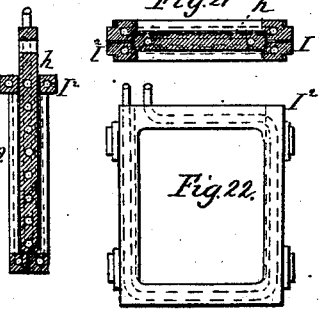
Witnesses:
Edmund Brodhag
Howell T. Bartle
Inventor:
Fritz Lürmann
by his Attys
Johnson and Johnson
N. PETERS, Photo-Lithographer, Washington, D. C.

(No Model.) 6 Sheets—Sheet 5.
F. LÜRMANN.
APPARATUS FOR THE CONTINUOUS DISTILLATION, SUBLIMATION, OR ROASTING OF SOLID MATERIALS.
No. 279,099. Patented June 5, 1883.
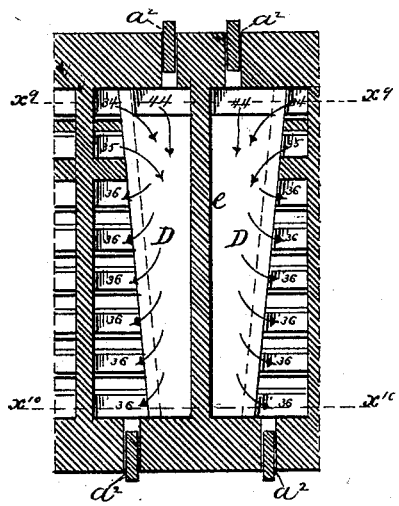
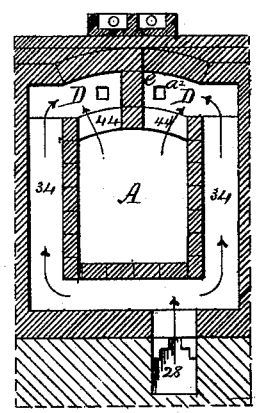
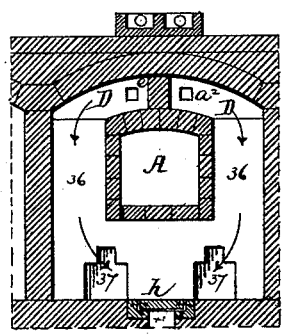
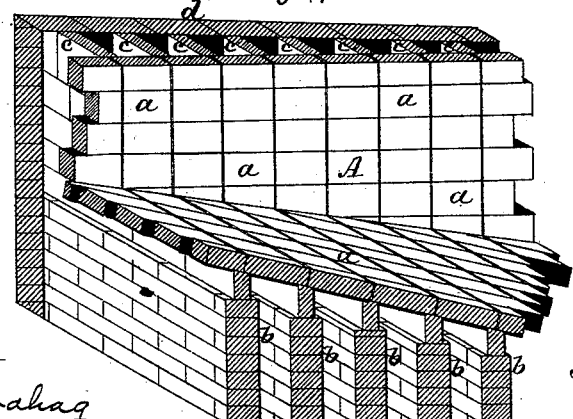
Witnesses:—
Edmond Brodhag
Howell Bartle
Inventor
Fritz Lürmann
by his Attys
Johnson and Johnson
N. PETERS, Photo-Lithographer, Washington, D. C.

(No Model.) 6 Sheets—Sheet 6.

F. LÜRMANN.
APPARATUS FOR THE CONTINUOUS DISTILLATION, SUBLIMATION, OR ROASTING OF SOLID MATERIALS.

No. 279,099. Patented June 5, 1883.

Witnesses:
Edmond Brodkey
Nowell J. Bartle

Inventor
Fritz Lürmann
by Johnson and Johnson
Attys

N. PETERS, Photo-Lithographer, Washington, D. C.

UNITED STATES PATENT OFFICE.

FRITZ LÜRMANN, OF OSNABRÜCK, GERMANY.

APPARATUS FOR THE CONTINUOUS DISTILLATION, SUBLIMATION, OR ROASTING OF SOLID MATERIALS.

SPECIFICATION forming part of Letters Patent No. 279,099, dated June 5, 1883.

Application filed February 23, 1881. (No model.) Patented in Germany June 8, 1880, No. 13,021, and June 26, 1880, No. 12,432; in Belgium August 31, 1880, No. 52,353; in France August 31, 1880, No. 138,504; in Austria-Hungary November 22, 1880, No. 26,597 and No. 35,757; in Luxemburg January 25, 1881, No. 112, and in England April 20, 1881. No. 4,098.

*To all whom it may concern:*

Be it known that I, FRITZ LÜRMANN, of Osnabrück, in the German Empire, have invented a new and useful Apparatus for Dry Distillation or Sublimation, (for which I have obtained a patent in Germany, bearing date June 26, A. D. 1880, No. 12,432,) of which the following is a specification.

This invention relates to improvements in apparatus for the continuous distillation, sublimation, or roasting of solid materials—such as coal, wood, ores, earths, and the like—and the objects of my improvements are to effect such distillation, sublimation, or roasting with rapidity and efficiency, and with safety to the oven, and to utilize as fuel the gases resulting from the treatment of the materials in the oven.

With these ends in view the invention consists in an oven having certain novel features of construction, which will be hereinafter fully described with reference to the accompanying drawings, in which—

Figure 29:
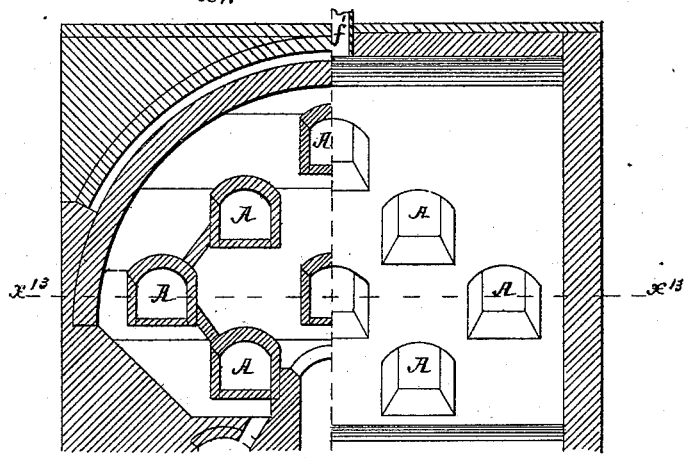
Figure 30:
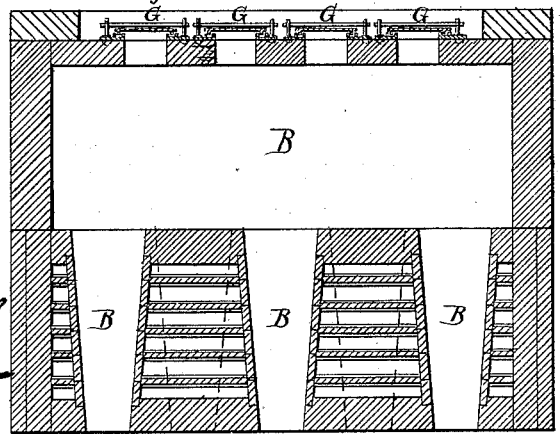

Figure 1 is a vertical section of a coke-oven constructed according to my invention, the section being taken through the longitudinal center of one of the distilling-chambers, with any number of which the oven may be provided. Fig. 2 is a horizontal and oblique section of an oven having three distilling-chambers, said section being taken in the planes indicated by the line $x\ x$ in Fig. 1. Fig. 3 is a horizontal section taken in the planes indicated by the line $y\ y$ of Fig. 1. Fig. 4 is a horizontal section on the line $z\ z$ of Fig. 1. Fig. 5 is a vertical section on the line $x'\ x'$ of Fig. 1. Fig. 6 is a horizontal section on line $x^2\ x^2$ of Fig. 1. Fig. 7 is a vertical section on line $x^3\ x^3$ of Fig. 1. Fig. 8 is a vertical section of a modified form of the oven. Fig. 9 is a horizontal section of a single oven on line $x^4\ x^4$ of Fig. 8. Fig. 10 is a horizontal section of the same on line $x^5\ x^5$ of Fig. 8. Fig. 11 is a horizontal section of the same on line $x^6\ x^6$ of Fig. 8. Fig. 12 is a horizontal section on line $x^7\ x^7$ of Fig. 8. Fig. 13 is a vertical section of another modification of the oven. Fig. 14 is a rear view of the same. Fig. 15 is a horizontal section of the same on line $x^8\ x^8$ of Fig. 13; Fig. 16, a view in perspective of so much of the furnace as shows the inclined floor-wall of the distilling-chamber and its transverse supporting-pillars of unequal thickness. Fig. 17 is a plan view of the horizontal register, with its water-tube shown in dotted lines. Fig. 18 is a similar view of the register-seat, and also a cross-section of the register and seat. Fig. 19 is a vertical central section of the horizontal register and its seat. Fig. 20 is a vertical section of the vertical register and its guide-frames. Fig. 21 is a horizontal central section of the same. Fig. 22 is a view in elevation of one of the guide-frames of the vertical register; and Fig. 23 a vertical section showing the flues surrounding chamber A. Fig. 24 is a horizontal section taken through the top fire-chambers above the flues. Fig. 25 is a vertical section of the same, taken on the dotted line $x^9\ x^9$ of Fig. 24. Fig. 26 is a vertical section taken on the line $x^{10}\ x^{10}$ of Fig. 24. Fig. 27 is a view in perspective of so much of the furnace as shows the inclined floor and vertical wall-flues and braces. Fig. 28 is a vertical section, showing the distilling or working ovens arranged at different levels. Fig. 29 represents a cross-section taken through the dotted line $x^{11}\ x^{11}$ and $x^{12}\ x^{12}$ of Fig. 28. Fig. 30 represents a horizontal section taken on the dotted line $x^{13}\ x^{13}$ of Fig. 29.

In this construction the gaseous products of distillation are collected in the cooling-chamber B.

The letter A, wherever it appears, indicates a distilling or treating chamber of the oven, and the various flues are designated by numerals. The cooling-chambers, into which the coke is discharged from the distilling-chambers, are marked with the letter B, and the charging apparatus, which forces the coal into the distilling-chambers, is shown at C.

An important and advantageous feature of the distilling-chamber constructed according to my invention consists in its very thin but thoroughly-braced walls of small-sized fire-bricks. The object in making these walls thin is that the heat from the products of combustion circulating in the adjacent flues may pass freely through them. The coal being heated in the distilling-chambers, and, being thin, these walls must be thoroughly braced from the outside in order to prevent them from being broken or crushed by the great pressure of the coal and coke which are forced through the chambers by the charging apparatus.

The wall-bricks of the distilling-chambers are indicated by the letter a, said bricks being of small size. Quite a number, placed edge to edge, is required to form each wall. The bricks of the floor-wall are supported by pillar-walls b, having the thickness of only a single brick at the top, and extend across the floor, as shown, these pillar-walls resting at their bottoms on suitable masonry, m, and separated by intervening spaces forming flues, which will be presently referred to. The distilling-chamber is gradually enlarged from its charging to its discharging end by giving the floor-walls a downward and inward inclination, as shown in Figs. 1 and 16, and the pillar-walls therefore decrease in height toward the discharging end of the chamber. The flues formed between the pillar-walls (see Figs. 1, 8, 13, and 16) extend entirely across the lower surface of the floor-wall. The object in thus gradually enlarging the treating-chamber is to prevent the choking up of the same by the solid materials forced into the same under great pressure.

The side walls of the distilling-chamber are braced by thin walls c, (see Fig. 3,) separated by intervening spaces forming vertical flues. These walls c have their edges opposite the chamber abutted against suitable supporting walls or partitions, d, of masonry.

The roof-wall of the distilling-chamber is composed of two rows of arched bricks, as shown, meeting above the longitudinal center of the floor, and resting upon the side walls.

Along the longitudinal center of the top surface of the roof-wall runs a partition-wall, e, (see Fig. 6,) extending from the rear wall, f, of the oven toward the front for about two-thirds the length of the chamber, and is then inclined to one side, as shown at e', the inclined portion terminating at and joining with the upper portion of the last side bracing-wall, c, toward the front. The ends of the distilling-chamber are supported in the front and rear vertical walls of that portion of the oven in which they are situated, said walls being provided with suitable ledges, m', Fig. 16, supporting the ends of the end bricks of the chamber-walls.

Under the masonry m, upon which the pillar-walls b rest, are formed flues 28 29 30, Figs. 2 and 15, the said flue 28 communicating through openings 31 31, Figs. 4 and 13, in its roof-wall, with the first two horizontal flues, 32 33, which are separated by the first horizontal pillar-wall, b, and these two horizontal flues 32 and 33 are in communication with the first two vertical flues, 34 35, Fig. 6, which are separated by the first side bracing-wall, c, near the discharging end of the chamber and at one side thereof. These flues 34 and 35 connect with the chamber D, called the "fire-chamber," which is at one side of the partition e e', above the roof-wall of the distilling-chamber. This chamber is in communication with the tops of the vertical flues 36 36, Figs. 3 and 6, between the bracing-walls c on that side of the chamber, and these vertical flues 36 are in communication at their bottoms with the horizontal flues 37, Figs. 1, 4, and 13, which at their opposite ends are in communication with the vertical flues 38, Figs. 3 and 6, which at their tops are in communication with the chamber E, called the "accumulation-chamber," on the opposite side of the partition e e' from the fire-chamber. At its front end the accumulating-chamber E is in communication with the vertical flue 39, Figs. 3, 6, 13, which is between the front wall of the oven and the first adjacent side bracing-wall, c, on that side of the distilling-chamber. At its lower end this flue 39 communicates with a horizontal flue, 40, Figs. 1, 7, 8, 13, which is under the front end of the distilling-chamber, and between the first wall of the oven and the first adjacent pillar-wall b. This flue 40 is closed by a transverse wall, g, Fig. 7, but is in communication with an exit-flue, 41, Fig. 1, which leads down through the masonry to a general exit-flue, 42, Fig. 1, which is common to the exit-flues 41, leading from the circulating-flues of all the distilling-chambers in the oven. This general exit-flue 42 leads to a smoke-stack, 43. (See Fig. 3.)

The flues 28, Fig. 2, communicate with transverse flues 27 into which lead the oblique flues 26, Figs. 1 and 2, which at their opposite lower ends open into a transverse flue, 25, which is in communication with the induction-flue 24, which communicates with the external air through the register h when the same is open, and by means of which the quantity of air entering the induction-flue may be regulated.

Through the roof-wall of the distilling-chamber, near its large end, is formed a passage, 44, Figs. 5 and 6, through which the gas passes from the distilling-chamber to the fire-chamber D to meet the air entering through the air-flues 34 and 35 to produce combustion.

The distilling-chambers open at their discharging ends into cooling-chambers B, of which there may be one for each distilling-chamber; or all of said distilling-chambers in an oven may open into a common cooling-chamber. The cooling-chamber has the lower portion of its inner wall inclined, as shown at f, to throw the coke forward toward the drawing-doors G as it falls from the distilling-chambers.

It is under the cooling-chamber B that the air-flues 24 25 26 are arranged, in order that the air passing in through said flues may assist in cooling the walls of said chamber, and at the same time become heated, in order to facilitate combustion when it meets the hot gases in the fire-chamber D.

I have not shown the furnace for heating the oven, as it may be constructed in any known and convenient manner, and have its flue, in connection with the general exit-flue 42, connecting with the smoke-stack 43, Fig. 3.

Each of the cooling-chambers may have one or more openings at its top, as indicated in dotted lines at $f'$, Fig. 1, to permit the escape of gas which has not passed to the fire-chamber; or when the gas is not to be burned, the opening in the roof of the distilling-chamber will be closed, and the openings $f'$ may be connected with suitable apparatus for saving and purifying the gas.

The operation of the oven, as described, when using the gas as fuel, is as follows: The oven is first heated up by the furnace, and the coal to be treated is fed into the funnel H, and thence passes into the charging end of the distilling-chamber, and is pressed forward into said chamber by the charging apparatus C, which may be of any known construction. As the coal is forced slowly through the heated distilling-chamber and formed into coke the greater portion of the gas given off passes through the opening 44, Fig. 5, highly heated, to the fire-chamber D, in which it meets the air, which, entering through the register $h$, traverses the flues 24 25 26 under the cooling-chamber, becoming heated by the waste heat, which the cooling coke in said chamber communicates to the walls, and thence passing through the flue 27 to flue 28, Fig. 5, rises through the openings 31 to the horizontal flues 32 33, Figs. 4 and 5, and traversing the same enters the two vertical flues 34 35, Figs. 3 and 6, passing through which it enters the fire-chamber D, and there, having become highly heated in its passage through the various flues, it meets and mixes with the hot gas and combustion ensues. The heated products of this combustion pass downward through the flues 36, Figs. 3 and 6, in contact with the adjacent side wall of the distilling-chamber, and pass into and traverse the horizontal flues 37, Figs. 4, 1, 3, 13, between the pillar-walls $b$, heating the bottom of the distilling-chamber by their contact, and leaving these flues pass up through the flues 38 to the accumulating-chamber E, and after traversing said chamber the heated products of combustion of the gas pass downward through flue 39 to the horizontal flue 40, and thence through the register I to the exit-flue 41, and from the said flue to the general exit-flue 42, which leads them to the smoke-stack 43, or to any apparatus in which this heat is desired to be further utilized.

It will be observed, from the arrangement of the flues through which the heated products of combustion pass in contact with the thin walls of the distilling-chamber, that a very large amount of heat will be communicated to the contents of the distilling-chamber, causing a rapid conversion of the coal into coke, which is gradually discharged into the cooling-chamber as fresh coal is driven into the distilling-chamber by the charging apparatus. The coke may be removed from the cooling-chamber through the doors G without interrupting the process of distillation, which may be continued as long as desired.

In the modified form of the oven shown in Figs. 8, 9, 10, 11, and 12 provision is made for a more efficient heating of the air before it meets the heated gas. The air enters through the bottom flue, 49, and, passing into transverse flues 50, rises thence through the vertical flues 51 to transverse flues 52, leading into a flue, 53, which takes the place of the flue 28 in the form of oven first described, and communicates with the flues above in a similar manner. Between the rows of vertical flues 51 are arranged a number of general exit-flues, 54, which are connected by slits 55, Fig. 10, formed through their separating-walls, the first of these general exit-flues toward the front being connected with the exit-flue 41, the same as in the first-described form of oven. In this modification it will be seen that the heated products of combustion pass off through flues, with the walls of which the incoming air passes in contact, and thereby becomes thoroughly heated.

In the modification shown in Figs. 13, 14, 15 the separate cooling-chamber is dispensed with and the distilling-chamber provided with a door, $k$, at its discharging end, through which the coke may be discharged into a wagon or other receptacle. In this modification the flues $28'$ $29'$ $30'$, Fig. 15, correspond to the flues 28 29 30 of the first-described form of oven, the flue $28'$ being extended through the rear wall of the oven and provided at its outer end with a register, $h'$, for the admission of air. The remaining construction of this form of oven is the same as that first described.

The iron registers for regulating the draft and the admission of air are subjected to a high degree of heat, which would result in their speedy destruction were they not in some way protected, and in order to effect such protection I embed in the body of each register a manifold or return-bend tube with the end projecting, so that one end may be connected with a suitable water-inlet pipe and the other to a discharge-pipe. I am thus enabled to maintain circulation of water through the body of the register to keep it below a destructive temperature. I also embed a tube in the seat or guide of each register in the same manner.

In Fig. 17, I is the horizontal register which controls the entrance to the exit-flue 41, as shown in Fig. 1, and $I'$, Fig. 18, is the open seat upon which said register slides. The register and its slide are made of cast-iron, and in the process of casting a wrought-iron manifold or return-bend tube, $i$, (shown mainly in dotted lines,) is embedded in the body of the register with its ends projecting, as shown at $i'$ $i^2$. Either one of the projecting ends may be connected to a water-supply and the other to a discharge-pipe.

In the cast-iron register-seat $I'$ a forged-iron pipe, $i^3$, is embedded in a similar manner, with its ends projecting for the same purpose.

The vertical register $h$, which guards the entrance to the induction air-flue 24, is of the same form and construction as the horizontal register. This vertical register slides between two open guide-frames, such as shown at I², Fig. 22. Two of these guide-frames are placed together, as shown in Figs. 20 and 21, with a guideway and grooves formed in them for the register $h$. The water-tubes embedded in the guides are shown in dotted lines in Fig. 22.

The roasting-chamber is always filled, and the operation is continuous, the charging being continuous or intermittent, giving density and firmness to the body of the material under treatment, and gradually moving it forward in a perpetually-packed condition, which permits of the making of very dense and firm coke.

The chambers may be arranged side by side, or at various levels, and their shape and dimensions must be suited to the material to be treated; but of whatever form, the walls must be thin to allow the heat to rapidly pass through them, and it is an important matter that they should be supported and braced, so as to withstand the high pressure produced by the packed condition, swelling, and movement of the materials being coked. For this purpose the top wall, $e$, the thin side walls, $c$, and the bottom pillars, $b$, are arranged to support the bricks of the chamber-walls at their joints against interior pressure, and at the same time form the circulating-flues.

It is important that the bottom flare downward from the charging apparatus, and that the walls be very hot to prevent the coals from adhering to them, as well as to repel them. Otherwise the moving of the material by the mechanical feed would require such an enormous power as to render the oven practically useless for continuous operation. The thin walls must therefore be supported at right angles from without in order to resist the great pressure from within, as shown in the detail, Fig. 24, Sheet 5. It is also important that these supporting-walls should be as thin as possible, and for this purpose the pillars are reduced in thickness where the floor rests upon them, the distance between the pillars from middle to middle being equal to the length of the brick used in the floor of the coking-chamber.

The heating of the coals commences in the front part of the chamber A, while the coals are advanced gradually and regularly and the coking continues without intermission. This end of the coking-chamber, where the cold and damp coals enter, is particularly well heated by the hot gases descending from the accumulating-chamber through the front flue, 39, Fig. 6, around the thin walls of the sides and bottom, as in Fig. 7.

The quantity of gas developed from the packed condition of the coals, the quantity of air necessary for combustion and for the draft, are maintained without change, and the working is consequently continuous under a high and regular temperature, the heat being quickly transferred to the coals through the thin walls of fire-brick of the oven, supported against the pressure of the coals along the vertical sides, along its top, and across the under side of the floor at the joints formed by each row of bricks. Were it not for this bracing and support the thin walls of brick and a mechanical feed could not be used. The top chamber-dividing wall, $e$, forms an outside support for the top thin wall of the working-chamber.

The coking operation can be watched through the wall-openings $a^2$, and the registers adjusted to regulate the draft to suit the material.

In removing the solid products from the cooling-chamber through the door the air is prevented from entering therein by reason of the pressure of gas in the entire oven, especially in the cooling-chamber, its top opening being then closed, and the coking is not therefore interrupted.

Two fire-chambers may be arranged over the coking-oven, as shown in Figs. 24, 25, and 26, Sheet 5. In this arrangement the gas enters through openings 44 at the rear end of the coking-chamber, and circulates through the flues 36 around said chamber, the gases passing out through the openings 37, which are arranged in the pillars under the furnace, and thence through the sliding register $h$ into the flue 41, thus equalizing the heat around the chamber, while the air enters the two fire-chambers in the same quantities through the openings 34 35, Fig. 25, producing a thorough mixing and complete combustion, with a more simple arrangement of the flues.

I am aware that in coking and distilling ovens the distilling-chambers have been constructed with flues adjacent to their walls for heating air to be mixed with gas and the mixture burned in other flues adjacent to the walls of the oven, and I do not claim such an oven, broadly. I am also aware that in furnaces and ovens valves and valve-seats have been formed of cast-iron with water-tubes embedded therein, and make no claim to such valves or their seats.

I have described the oven as being particularly adapted for the production of coke in which the resulting gases are utilized as fuel for heating the oven in the continuous operation thereof, and I have also stated that when it is not desired to thus utilize the gas as fuel it may be collected in the cooling-chamber and drawn therefrom for purification and for use. I have also stated that the distilling-chambers may be arranged at various levels, or side by side, and I have shown in Figs. 28, 29, and 30 the ovens arranged at various levels and adapted to save the volatile or gaseous products of distillation in the cooling-chamber. In the oven thus constructed there is no outlet for the gas in the roof of the distilling-chamber into the combustion-chamber; but the gas passes from said distilling-chamber into the cooling-chamber B, from whence, by one or several openings, $f'$, in the top or in the side, it is withdrawn into suitable apparatus for saving and purifying it. Otherwise the oven is same as that described for coking. The construction shown in these figures embraces eight ovens arranged at different levels. Their shape, length, breadth, and height must be suited to the purpose for which they are intended and the material which is to be distilled. The openings $f'$ are provided with suitable water-cooled registers adapted to withstand the heat. The solid products of distillation fall into the bottom of said cooling-chamber, from whence they are removed only when the gas-registers are closed, and pressure thereby produced in the entire apparatus, and especially within the cooling-chamber. Against this pressure the air cannot enter the cooling-chamber when its doors are opened to remove the solid products, and the operation of the sublimation or distillation is not interrupted, either in feeding the material to the oven, withdrawing the gas, or in withdrawing the material from the chamber within which the gas collects. By this continuous distillation the gas is produced from an oven charged under a continuous pressure by a continuous feed, discharging both the gas and the solid products regularly into a cooling-chamber closed against the entrance of air, from which the gas is withdrawn, and from which the solid products of combustion are withdrawn under a pressure in the cooling-chamber, produced by closing the outlets for the gas, whereby air is prevented from entering said chamber through the doors by which the solid products are discharged, and thereby maintain the continuous operation of the oven under a uniform heat and a uniform continuous feed of the material to be treated.

It will be understood that in this process the ovens will be heated in any suitable manner.

I claim—

1. In a distilling-kiln or coking-furnace, the working-oven constructed with a horizontal top and a downwardly-inclined floor, $a$, in combination with a closed chamber, B, having one or more discharge-doors, G, in its rear wall, and having a downwardly-flaring bottom, $f$, substantially as described, for the purpose specified.

2. A distilling-kiln or coking-oven having the cold-air-induction flues 24 25 26, the top fire-chamber, D, and the top chamber, E, for hot air, communicating with said air-induction flues, the oven A, communinating with said fire-chamber, and the chamber B, having its floor arranged adjacent to the cold-air-induction flues, whereby the walls of the latter will be heated by the waste heat of material cooling in said chamber B, substantially as described, for the purpose specified.

3. In a distilling-kiln or coking-oven, the working-oven A, having its bottom, side, and top walls formed of thin fire-brick placed flatwise in the walls, braced or supported at their joints all round the oven by right-angled walls, which also form flues bounded in one direction by the thin walls of the oven floor and sides, and the top chambers, in combination, with a charging apparatus arranged to force solid materials through said oven, substantially as described.

4. In a distilling-kiln or coking-oven, the working-oven A, having the top opening, 44, the fire-chamber D, communicating therewith, the flues 32, 33, 34, and 35, the accumulating-chamber E, and the exit-flues 39, 40, and 41, connected therewith, substantially as described.

5. In an oven for the purpose described, the treating-chamber A, having its walls formed of numerous small and thin fire-brick braced at the sides by the vertical heating-flue walls $c$, and supported at the bottom by the pillar-walls $b$, separated by heating-flues and braced at the top against interior pressure by the wall $e\ e'$, substantially as described, for the purpose specified.

6. The oven herein described, consisting of the horizontal treating-chamber A, having a downwardly-inclined bottom, the vertical cooling-chamber B, a charging apparatus, C, the top combustion-chamber, D, communicating with said treating-chamber, the accumulating-chamber E, exit-flues connected therewith, and sliding water-cooled registers, all constructed and adapted for continuous operation, substantially as described.

7. The combination, in a coking-oven, of a roasting-chamber, A, having its walls formed of small, thin fire-brick, with one or more fire-chambers, D, arranged above the roasting-chamber, communicating with it by a crown-opening, 44, therein, and with induction air and heating flues, and having a length nearly equal to that of said roasting-chamber, substantially as described, for the purpose specified.

8. The combination of the working-chamber A, having its walls formed of thin fire-brick in single rows, with a top chamber divided by a longitudinal wall, $e$, forming a gas and air receiving chamber, D, and a heat-accumulating chamber, E, and the descending-flue 39 at the side of the front end of said working-chamber, whereby the hot gases pass down and around the charging end of the working-chamber to heat the coal at the charging-point.

9. In combination, in a coking-furnace, the working-oven A, having its walls formed of thin fire-brick, its top horizontal, its sides vertical, and its bottom inclining downward to the discharge, with a mechanical feed for the material, and means, substantially such as described, for heating said chamber with the waste gases from the coking, and for regulating the draft.

This specification signed by me this 10th day of December, 1880.

FRITZ LÜRMANN.

Witnesses:
 WILH. BRAUER,
 AUG. SCHULTZ.